US010771322B2

(12) United States Patent
Dickens et al.

(10) Patent No.: US 10,771,322 B2
(45) Date of Patent: *Sep. 8, 2020

(54) TESTING AND DELIVERING VERIFICATION OF NETWORK CONFIGURATIONS

(71) Applicant: International Business Machines Corporation, Armonk, NY (US)

(72) Inventors: Louie A. Dickens, Tucson, AZ (US); Rodolfo Lopez, Austin, TX (US); Julio A. Maldonado, Austin, TX (US); Juan G. Rivera, Austin, TX (US); Pedro V. Torres, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/807,107

(22) Filed: Nov. 8, 2017

(65) Prior Publication Data

US 2019/0044790 A1 Feb. 7, 2019

Related U.S. Application Data

(63) Continuation of application No. 15/667,286, filed on Aug. 2, 2017.

(51) Int. Cl.
*H04L 12/24* (2006.01)
*G06F 11/30* (2006.01)
*H04L 12/26* (2006.01)

(52) U.S. Cl.
CPC .......... *H04L 41/069* (2013.01); *H04L 41/145* (2013.01); *H04L 41/147* (2013.01);
(Continued)

(58) Field of Classification Search
CPC ... H04L 47/00; H04L 7/10; H04L 7/11; H04L 47/0873; H04L 41/069; H04L 41/145;
(Continued)

(56) References Cited

U.S. PATENT DOCUMENTS 7,120,819 B1 * 10/2006 Gurer .................. G06F 11/2294
714/4.2
7,305,466 B1 12/2007 Kaffine et al.
(Continued)

OTHER PUBLICATIONS

Lili Qiu et al., Troubleshooting Wireless Mesh Networks, Newsletter ACM SIGCOMM Computer Communication Review Homepage archive vol. 36 Issue 5, Oct. 2006, pp. 17-28, ACM.
(Continued)

*Primary Examiner* — James R Sheleheda
*Assistant Examiner* — Franklin S Andramuno
(74) *Attorney, Agent, or Firm* — Patterson + Sheridan, LLP

(57) ABSTRACT

Methods to perform an operation comprising receiving an indication of a type and a target of a fault to inject in a network, the network comprising a plurality of devices and a plurality of network elements, generating at least a first predicted network map depicting a predicted configuration of the plurality of devices and network elements subsequent to injecting the fault in the network, injecting the fault at the target in the network, generating an actual network map depicting an actual configuration of the plurality of devices and network elements, identifying, based on a comparison of the first predicted network map and the actual network map, at least one difference in the predicted and actual configurations, and outputting for display an indication of the identified at least one difference.

7 Claims, 9 Drawing Sheets

(52) U.S. Cl.
CPC .......... *H04L 43/50* (2013.01); *G06F 11/3006* (2013.01); *H04L 41/0654* (2013.01); *H04L 41/0836* (2013.01); *H04L 43/04* (2013.01); *H04L 43/045* (2013.01)

(58) Field of Classification Search
CPC ... H04L 41/147; H04L 43/50; H04L 41/0654; H04L 41/0836; H04L 43/04; H04L 43/045; G06F 11/3006
See application file for complete search history.

(56) References Cited

U.S. PATENT DOCUMENTS

| | | |
|---|---|---|
| 9,007,922 B1 | 4/2015 | Mittal et al. |
| 2005/0169186 A1 | 8/2005 | Qiu et al. |
| 2005/0204028 A1* | 9/2005 | Bahl .................. H04L 41/0873 709/223 |
| 2005/0283530 A1* | 12/2005 | O'Neal ............... H04L 12/1854 709/224 |
| 2013/0315579 A1* | 11/2013 | Xia .................... H04Q 11/0001 398/5 |
| 2013/0346578 A1* | 12/2013 | Varki ...................... H04L 47/28 709/223 |
| 2016/0085641 A1* | 3/2016 | Nagasubramaniam ..................... H04L 41/0654 714/4.11 |
| 2018/0337828 A1* | 11/2018 | Cohen ..................... H04L 41/12 |

OTHER PUBLICATIONS

U.S. Appl. No. 15/667,286 entitled "Testing and Delivering Verification of Network Configurations,", as filed on Aug. 2, 2017.

IBM, "List of IBM Patents or Patent Applications Treated as Related," for U.S. Appl. No. 15/807,107, filed Nov. 8, 2017.

\* cited by examiner

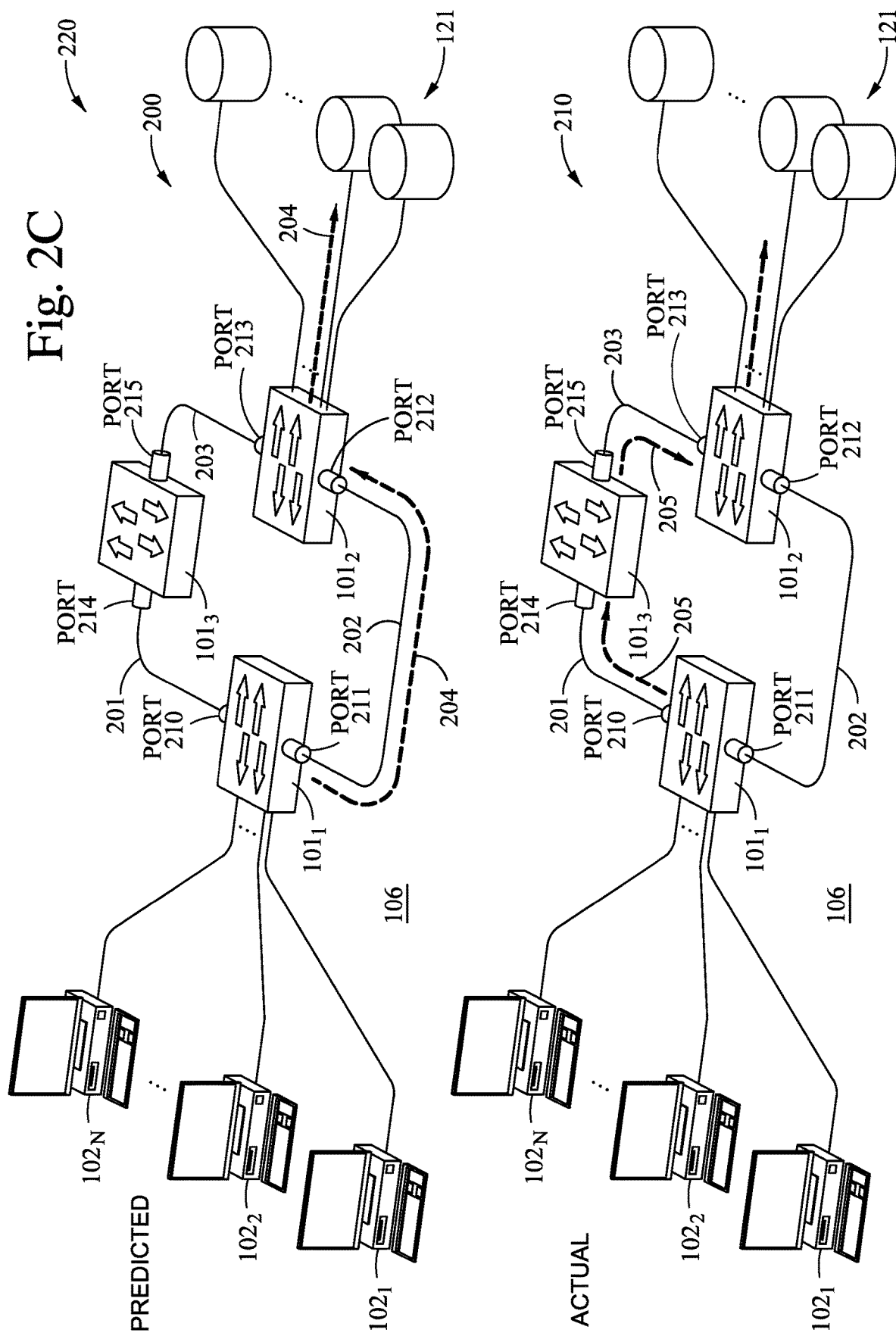

TESTING AND DELIVERING VERIFICATION OF NETWORK CONFIGURATIONS

CROSS-REFERENCE TO RELATED APPLICATIONS

This application is a continuation of co-pending U.S. patent application Ser. No. 15/667,286, filed Aug. 2, 2017. The aforementioned related patent application is herein incorporated by reference in its entirety.

BACKGROUND

The present disclosure relates to computer networks, and more specifically, to testing and delivering verification of network configurations.

The internal complexity of networks, such as local area networks (LANs) and storage area networks (SANs) has increased exponentially because of virtualization and software defined networking (SDN). Modern networks are managed using SDN, regardless of whether the devices are physical or virtual. While SDN and virtualization have dramatically reduced the complexity for end users and network administrators, they have increased the complexity for network testing.

Conventionally, users engaged in network testing injected errors and/or unplugged cables on a networking device, and used network monitoring software to ensure the device failed over properly and network I/O continued running properly. However, this method is no longer adequate in modern networks, as unplugging a single cable or injecting a failure could result in a total reconfiguration of the network. As such, the tester not only needs to know that the failover occurred, the tester must also need to determine whether the new network configuration is the optimal configuration for the failure condition.

SUMMARY

According to one embodiment of the present disclosure, a method comprises receiving an indication of a type and a target of a fault to inject in a network, the network comprising a plurality of devices and a plurality of network elements, generating at least a first predicted network map depicting a predicted configuration of the plurality of devices and network elements subsequent to injecting the fault in the network, injecting the fault at the target in the network, generating an actual network map depicting an actual configuration of the plurality of devices and network elements, identifying, based on a comparison of the first predicted network map and the actual network map, at least one difference in the predicted and actual configurations, and outputting for display an indication of the identified at least one difference.

BRIEF DESCRIPTION OF THE SEVERAL VIEWS OF THE DRAWINGS

FIGS. 2A-2C depict example graphical user interfaces for testing and delivering verification of network configurations, according to various embodiments.

DETAILED DESCRIPTION

Embodiments disclosed herein provide enhanced frameworks for testing networks. Generally, embodiments disclosed herein predict a network topology that would result when an error is injected into the network. In at least one embodiment, the error may be specified by a user, which includes an indication of a location (e.g., a networking device) and a type of the error. Embodiments disclosed herein may then inject the specified error into the network and determine the actual resultant network topology after the network is reconfigured responsive to the injected failure. Furthermore, embodiments disclosed herein may compare the actual and predicted network topologies, and output an indication of the comparison to the user. Doing so exposes enhanced network management tools which facilitate improved and more accurate testing of networks.

Figure 1:
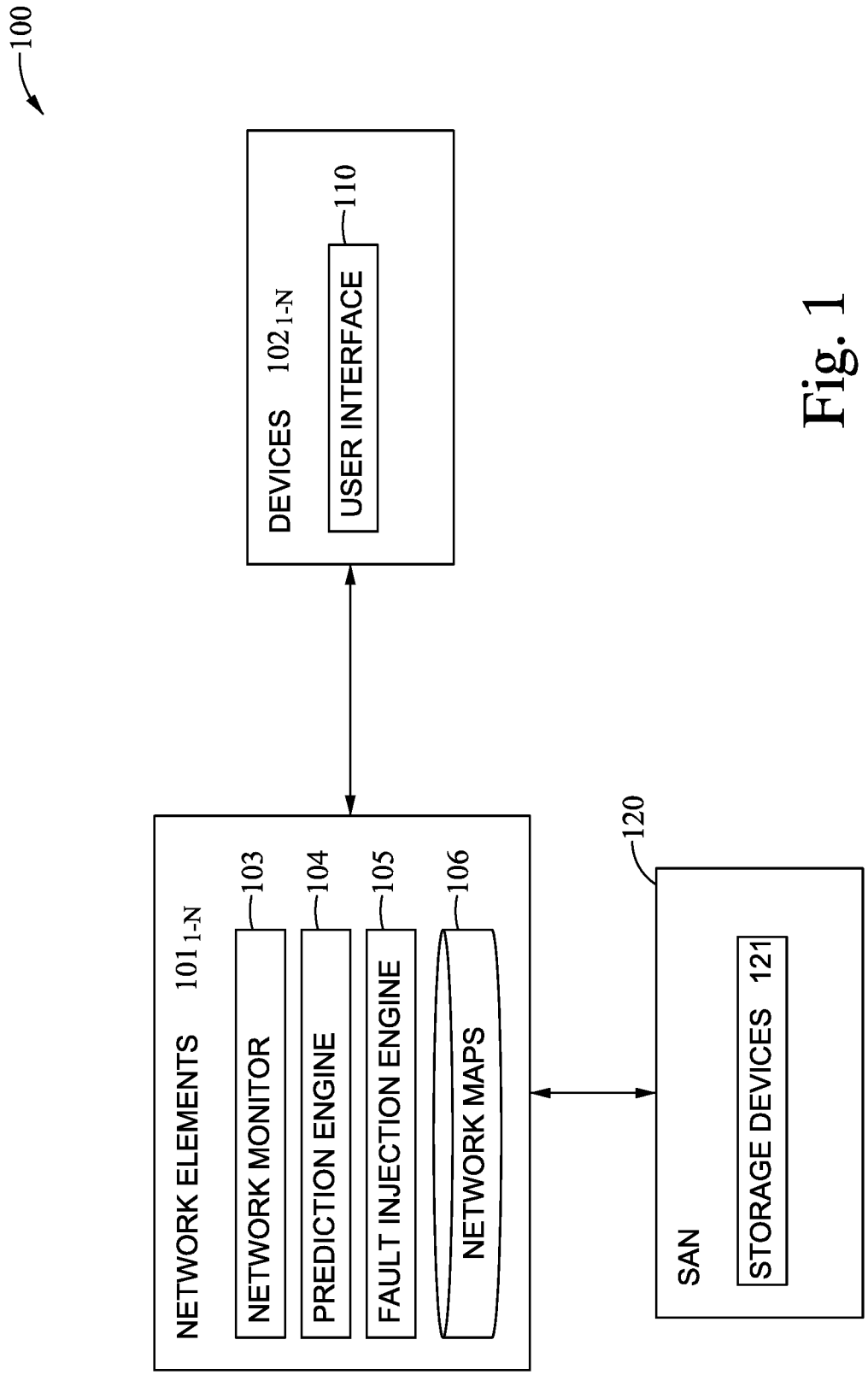
FIG. 1 illustrates an example network architecture which tests and delivers verification of network configurations, according to one embodiment.

FIG. 1 illustrates an example network architecture 100 which tests and delivers verification of network configurations, according to one embodiment. The network 100 is representative of any type of network, such as a local area network (LAN), a storage area network (SAN), a software defined network (SDN), and any combination thereof. As shown, the network 100 includes a plurality of network elements $101_{1-N}$, a plurality of devices $102_{1-N}$, and a storage area network (SAN) 120. The network elements $101_{1-N}$ are representative of any type of networking element, such as a router, switch, bridge, firewall, network controller, layer-2 devices, layer-3 devices, and the like. Individually and/or collectively, the network elements $101_{1-N}$ facilitate network communication between the devices $102_{1-N}$, the storage devices 121 of the SAN 120, and any combination thereof. The devices $102_{1-N}$ are representative of any type of computing device, such as a server, laptop, desktop, smartphone, tablet, and the like. The storage devices 121 of the SAN 120 may include any type of non-transitory storage medium, such as hard disks, flash memory, optical storage devices, tapes, and the like. In at least one embodiment, the storage devices 121 of the SAN 120 appear as locally attached devices to one or more of the devices $102_{1-N}$.

As shown, each network element $101_{1-N}$ includes a network monitor 103, a prediction engine 104, a fault injection engine 105, and a data store of network maps 106. The network monitor 103 is configured to monitor the state of the network 100 using one or more monitoring and/or discovery protocols. Generally, the state of the network includes information (e.g., health information, connectivity, etc.) regarding the network elements $101_{1-N}$, the devices $102_{1-N}$, the storage devices 121 of the SAN 120, and any physical and/or wireless network connections there between. The network monitor 103 is also configured to generate network maps 106 which depict the current state of the network 100.

The prediction engine 104 is configured to receive input specifying a type and location of a proposed network fault, and performs computations necessary to predict the resultant network state(s) and any error recovery steps necessary to heal the network if the proposed network fault is injected at the specified location. The fault injection engine 105 is configured to communicate the type and location of the proposed network fault, where, once received, the fault is injected into the network. However, conventional network protocols do not support communicating the type of errors and the target of such errors in software defined networks. Therefore, embodiments disclosed herein contemplate extending conventional network protocols to support the specification of fault types and fault targets. In such embodiments, the fault injection engine 105 communicates the type and location of the fault via an application programming interface (API) call to a software defined network controller (e.g., one of the network elements $101_N$ configured as an SDN controller). In other embodiments, the fault injection engine 105 communicates the type and location of the fault via an API call to an automated patch panel and/or a jammer.

The user interface 110 of the devices $102_{1-N}$ allows a user to define a type and location of a fault to inject in the network 100. For example, a user may specify to inject a fault at network element $101_2$, where the fault disables a first port of the network element $101_2$. In response, the prediction engine 104 generates a plurality of different network maps 106, where each different network map 106 represents one of a plurality of possible configurations of the network 100 after the first port of the network element $101_2$ is disabled. The prediction engine 104 also generates a set of error recovery steps that are associated with healing the network for each possible network configuration. The fault injection engine 105 may then communicate the fault to the network element $101_2$, which injects the fault, disabling the first port of the network element $101_2$. The network monitor 103 may then determine the resultant state of the network 100 after the first port of the network element $101_2$ is disabled. In at least one embodiment, the network monitor 103 waits for a predefined amount of time before determining the resultant state of the network. The network monitor 103 may then compare the actual resultant network state to the network states predicted by the prediction engine 104, and return a result of the comparison to the user. Furthermore, the network monitor 103 may determine whether the network topology after the fault is injected is the optimal topology.

Figure 2A:
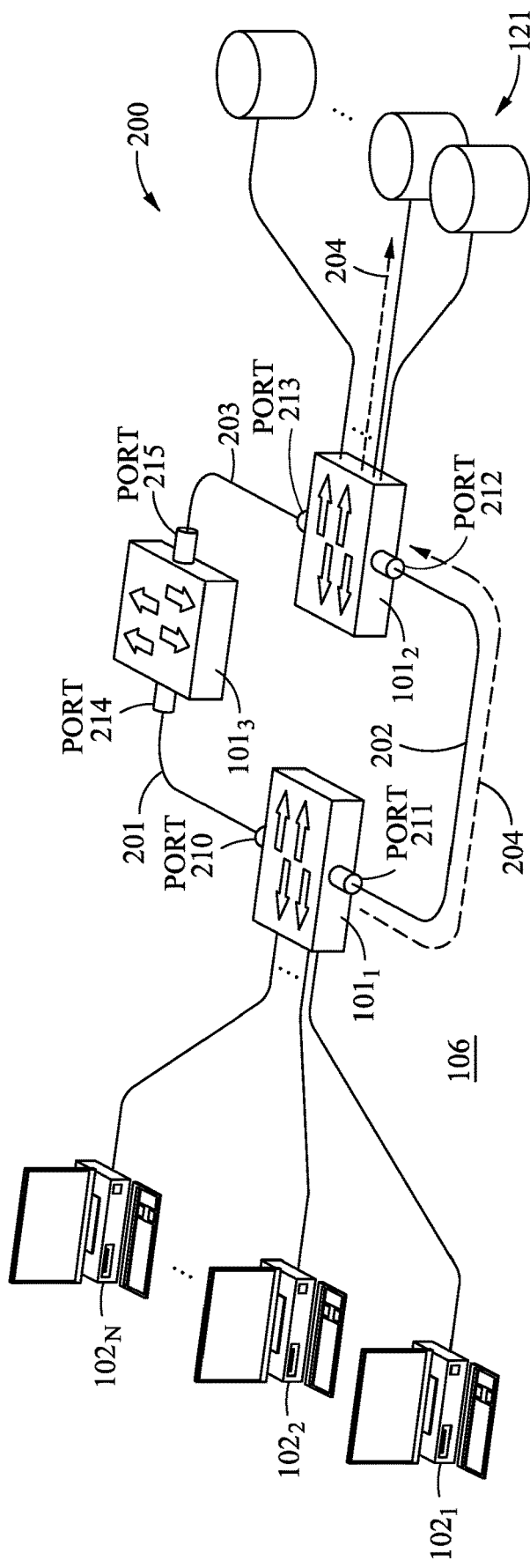

FIG. 2A depicts an example graphical user interface (GUI) 200 for testing and delivering verification of network configurations, according to various embodiments. More specifically, the GUI 200 depicts a predicted network map 106 generated by the prediction engine 104 responsive to user input received via the user interface 110. As previously indicated, the user may specify a type and location of an error to inject into the network 100 via the user interface 110. In the example depicted in FIG. 2A, the user may specify to inject a fault which floods the network elements $101_{1-N}$ with garbage data (e.g., data that is not properly formatted). In response, the prediction engine 104 predicts one or more network maps 106 that reflect the state of the network 100 after the specified fault is injected.

As shown, the GUI 200 depicts an example network map 106 that includes a plurality of devices $102_{1-N}$, three example network elements $101_{1-3}$, and a plurality of storage devices 121. As shown, the GUI 200 depicts two network ports of the network elements $101_{1-3}$. Specifically, network element $101_1$ includes ports 210-211, network element $101_2$ includes ports 212-213, and network element $101_3$ includes ports 214-215. The GUI 200 further depicts network connections 201-203 between the respective ports 210-215. For example network connection 201 connects ports 210, 214 of network elements $101_{1,3}$, respectively, network connection 202 connects ports 211, 212 of network elements $101_{1,2}$, respectively, and network connection 203 connects ports 213, 215 of network elements $101_{2,3}$, respectively. As previously indicated, the user may specify to inject a fault which floods network connection 201 with garbage data. In response, the prediction engine 104 generates the GUI 200 which includes the network map 106, which reflects one possible configuration of the network 100 after the garbage data is injected. As shown, the GUI 200 includes an optimal path 204 for data traveling from at least some of the devices $102_{1-N}$ to the storage nodes 121. The optimal path 204 includes network elements $101_{1,2}$. In one embodiment, the optimal path 204 is the network connection 202 between ports 211, 212 of network elements $101_{1,2}$. Therefore, once the fault injection engine 105 injects the fault, the network 100 should be configured such that traffic follows the optimal path 204.

Figure 2B:
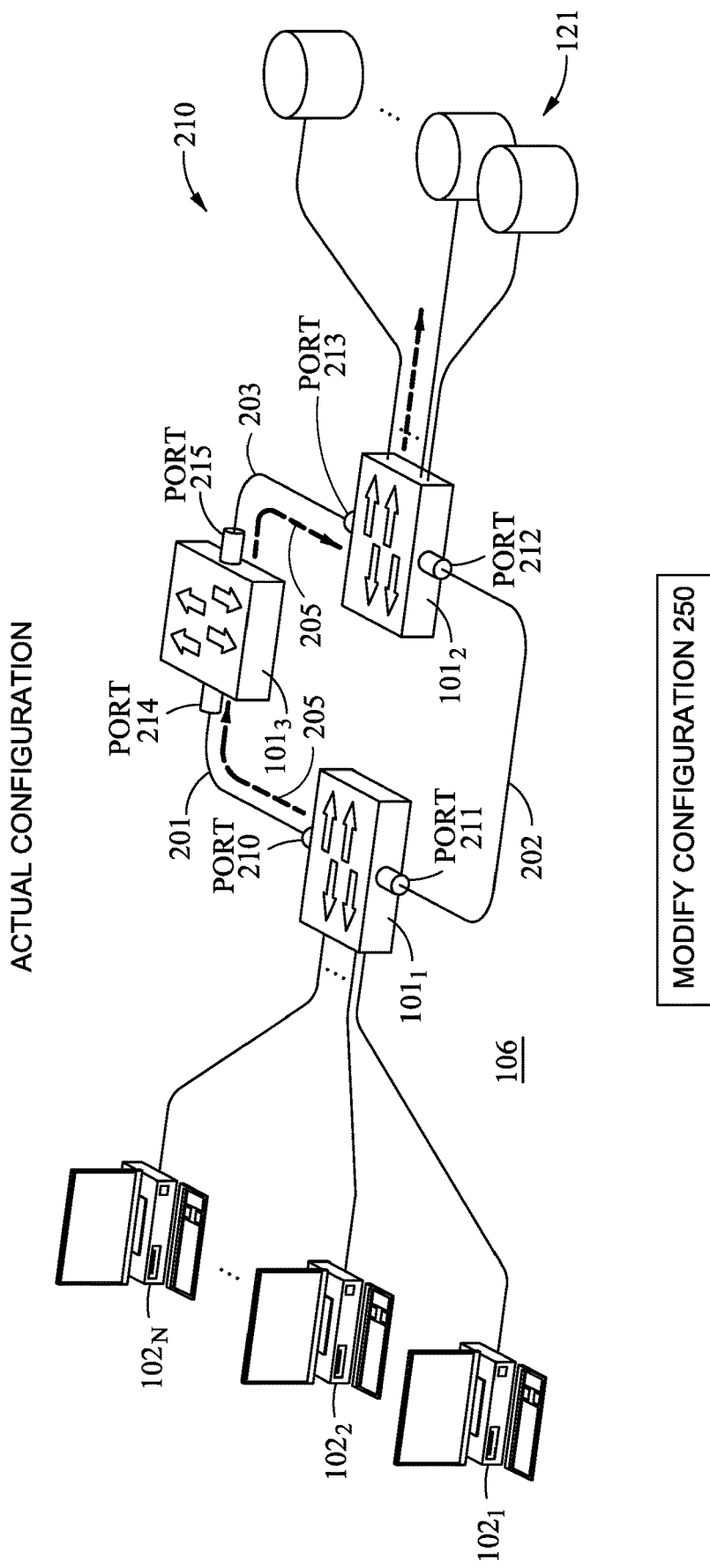

FIG. 2B depicts a GUI 210 which includes an actual network configuration map 106 that reflects a state of the network 100 after the fault injection engine 105 floods the network connection 201 with garbage data. In at least one embodiment, the network monitor 103 generates the GUI 210 after a threshold amount of time has elapsed from the time when the fault is injected. As shown, the GUI 210 depicts an actual traffic flow 205 from at least some of the devices $102_{1-N}$ to the storage devices 121 of the SAN 120. However, as shown, the actual traffic flow 205 traverses network connection 201 from network element $101_1$ to network element $101_3$, and then traverses network connection 203 from network element $101_3$ to network element $101_2$. Therefore, the predicted network configuration depicted in FIG. 2A does not match the actual network configuration in FIG. 2B. As such, performance of the network 100 is degraded, as traffic is not following the optimal network path 204. Instead, the traffic follows the actual network path 205, which is likely affected by the garbage data injected by the fault injection engine 105.

As shown, the GUI 210 includes a modify configuration button 250, which, when selected by the user, reconfigures the actual network path 205 to mirror the optimal network path 204. For example, in some embodiments, the prediction engine 104 and/or the network monitor 103 may compare the predicted and actual network maps 106 from FIGS. 2A, 2B, and determine that the optimal and actual network paths 204, 205 differ. As such, the network monitor 103 and/or the prediction engine 104 may determine a set of steps to reconfigure the network 100 to modify the actual network path. For example, the set of steps may include reprogramming routing tables in the network elements $101_{1-3}$ to ensure that at least some network traffic from the devices $102_{1-N}$ follows the optimal network path 204, and not the actual network path 205.

FIG. 2C depicts a GUI 220 which includes the predicted and actual network maps 106 from the GUIs 200, 210 of FIGS. 2A, 2B. As shown, the GUI 220 emphasizes that actual network path 205 is not the optimal network path 204 identified by the prediction engine 104. The example depicted in FIG. 2C includes bolding the optimal and actual network paths 204, 205, to emphasize the difference. However, other examples include a popup icon indicating the identified difference, different fonts, different formatting, etc. Doing so allows network administrators and/or testers to correct the actual network path 205. For example, the user may select the modify configuration button 250 (not pictured in FIG. 2C for the sake of clarity), which reconfigures the actual network path 205 to mirror the optimal network path 204. Doing so improves performance of the network 100, by reconfiguring the network 100 to avoid the slower network path 205 in favor of the optimal network path 204 when possible.

Figure 3:
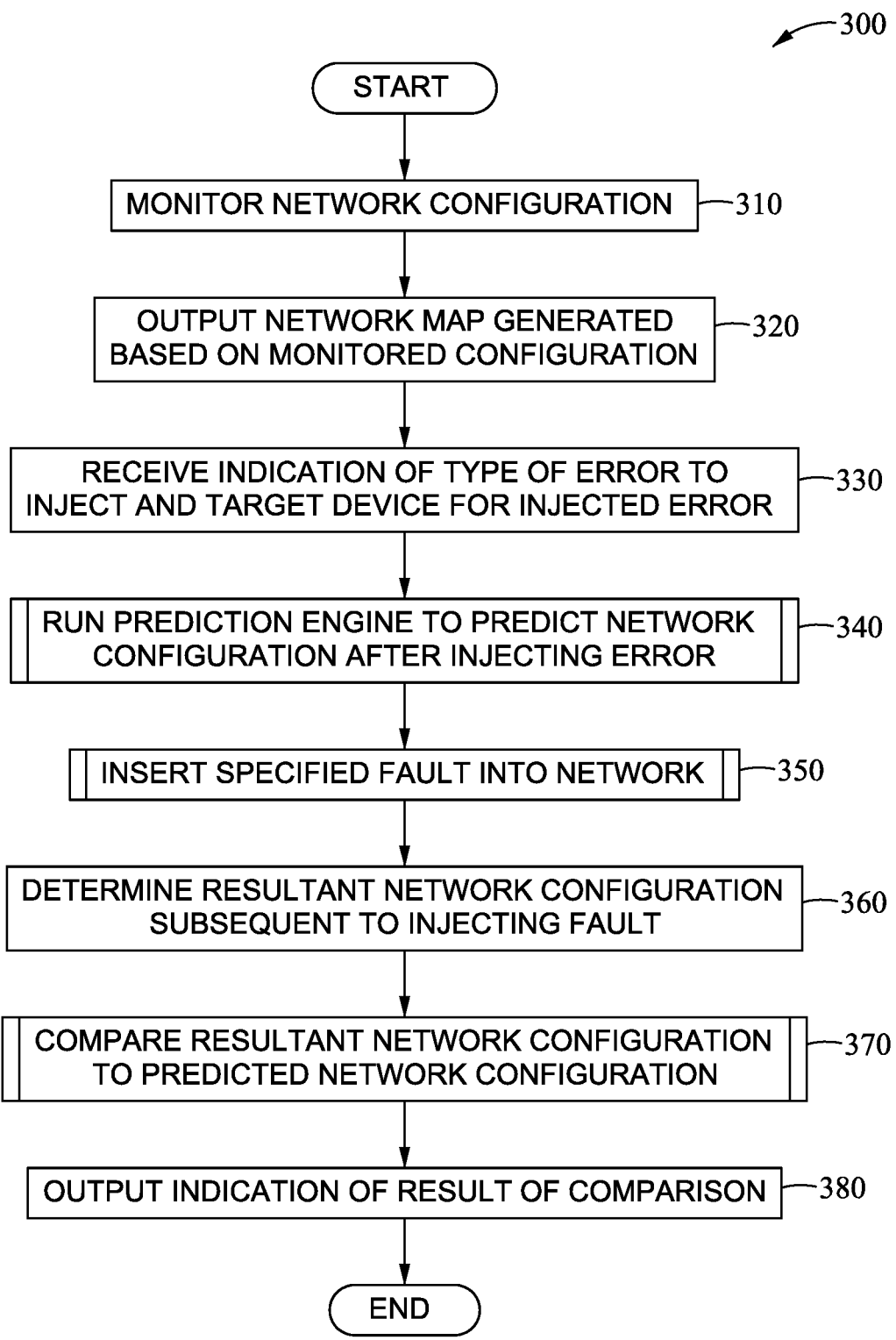
FIG. 3 is a flow chart illustrating a method for testing and delivering verification of network configurations, according to one embodiment.

FIG. 3 is a flow chart illustrating a method 300 for testing and delivering verification of network configurations, according to one embodiment. As shown, the method 300 begins at block 310, where the network monitor 103 continuously monitors the configuration state of the network 100. Generally, at block 310, the network monitor 103 determines the current network topology of the network 100 to generate a network map 106 which includes any network entities, e.g., the network elements $101_{1-N}$, devices $102_{1-N}$, and storage devices 121 deployed in the SAN 120. The network monitor 103 further determines attributes of each network entity, such as a description, set of capabilities, current operating status, any experienced errors, and the like. At block 320, the network monitor 103 outputs the network map 106 generated at block 310 for display. Doing so allows a user to view the current network status, allowing the user to determine which, if any, network tests should be implemented. At block 330, the user provides input specifying a type of error to inject into the network 100 and the location (e.g., a target network element $101_{1-N}$, a target device $102_{1-N}$, and/or a target storage node $121_{1-N}$) of the error. Example error types include disabling network ports, enabling network ports, injecting garbage data into links, shutting down the target, rebooting the target, etc.

At block 340, described in greater detail with reference to FIG. 4, the prediction engine 104 generates one or more predicted network configurations that will result when the error is injected into the network. Generally, at block 340, the prediction engine 104 generates one or more predicted network maps 106 that reflect the configuration of the network 100 when the error is injected. At block 350, described in greater detail with reference to FIG. 5, the fault injection engine 105 injects the error at the location specified by the user at block 330. In some embodiments, a SDN controller network element $101_N$ receives the indications of the fault type and location, and communicates the fault to the specified location. Doing so "injects" the desired type of fault in the specified location. At block 360, the network monitor 103 determines the resultant network configuration subsequent to injecting the fault at block 350. For example, if the user specifies to disable a port of a network element $101_N$, the network 100 reconfigures itself once the port is disabled. The network monitor 103 then generates a network map 106 reflecting the reconfigured network topology. At block 370, described in greater detail with reference to FIG. 6, the network monitor 103 and/or the prediction engine 104 compare the resultant network map 106 determined at block 360 to the predicted network map 106 generated at block 340. Doing so identifies any differences in the network maps 106. At block 380, the network monitor 103 and/or the prediction engine 104 outputs an indication of the result of the comparison to the user. For example, the network monitor 103 may output the actual and predicted network maps 106 for display, highlighting any differences between the network maps 106. The network monitor 103 may also identify any reconfiguration steps that would reconfigure the network 100 to achieve optimal performance in light of the injected fault. The user may then specify to implement the reconfiguration steps such that the network configuration is optimized.

Figure 4:
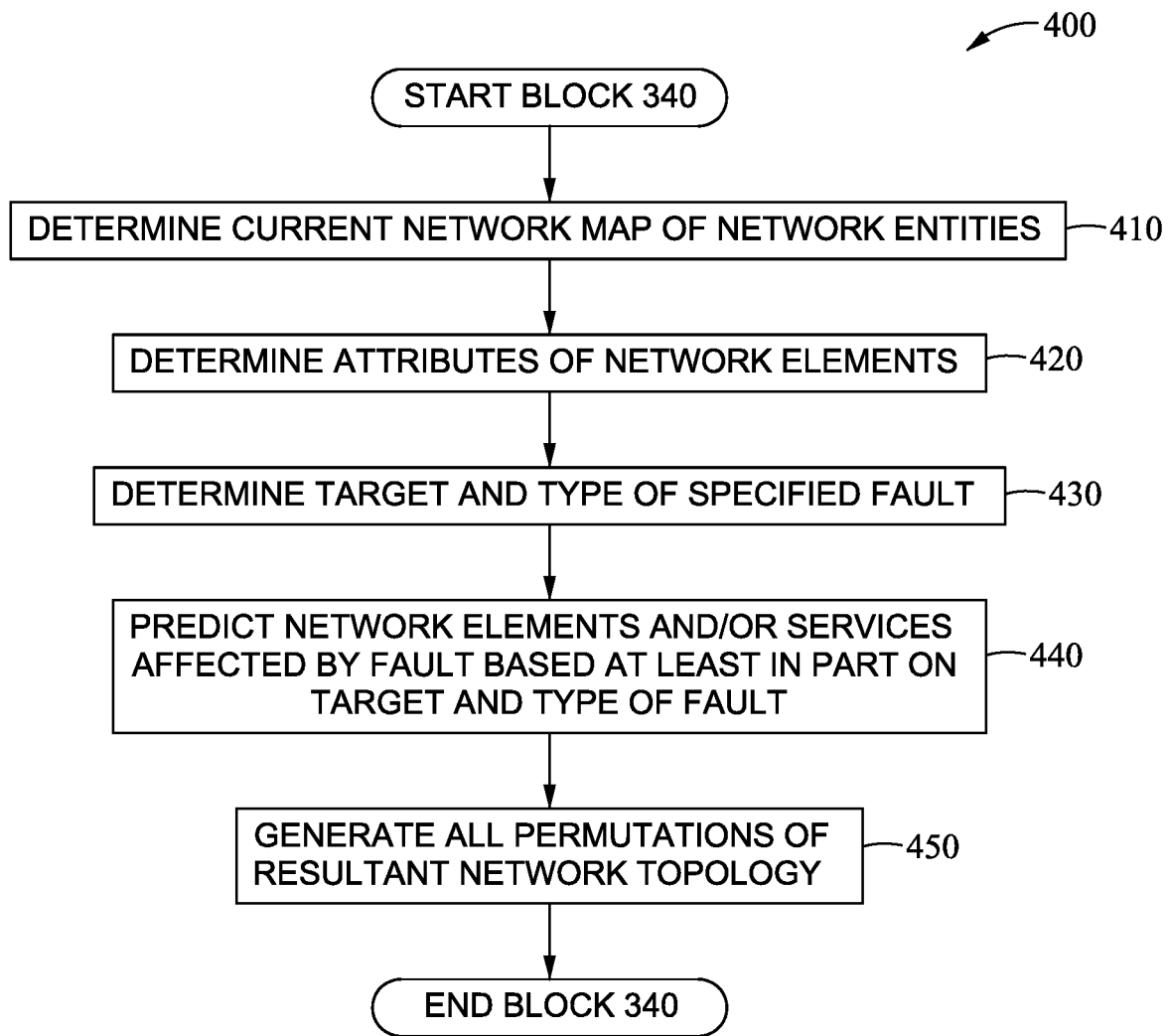
FIG. 4 is a flow chart illustrating a method for predicting a network configuration after injecting an error, according to one embodiment.

FIG. 4 is a flow chart illustrating a method 400 corresponding to block 340 for predicting a network configuration after injecting an error, according to one embodiment. As shown, the method 400 begins at block 410, where the network monitor 103 determines the current network map 106 of network entities (e.g., the network elements $101_{1-N}$, devices $102_{1-N}$, and storage devices 121 deployed in the SAN 120). Generally, the network monitor 103 may use network discovery protocols to communicate with each network entity, and receive responses therefrom. At block 420, the network monitor 103 determines the attributes from the responses received during the discovery process at block 410. The attributes may include configurations, parameter settings, statuses, health, capabilities, and the like. At block 430, the prediction engine 104 determines the target and type of fault specified by the user at block 330. At block 440, the prediction engine predicts which network entities and/or services will be affected by injecting the fault based at least in part on the current network map 106, the determined attributes of the network entities, and the target and type of the network fault. For example, if the fault specifies to disable a port on an end-user computing device $102_N$, the prediction engine 104 may determine that only the network element $101_N$ that is directly connected to that port is affected. However, if the fault specifies to disable all ports on the network element $101_1$, the prediction engine 104 may determine that all storage nodes 121, devices $102_{1-N}$, and network elements $101_{2-N}$ that are connected to the network element $101_1$ are affected. At block 450, the prediction engine 104 generates a network map 106 for each possible permutation of the network configuration based on injecting the error at the specified target. Generally, the prediction engine 104 determines all possible network configurations that will result from injecting the error into the network 101, and generates a network map 106 for each possible network configuration.

Figure 5:
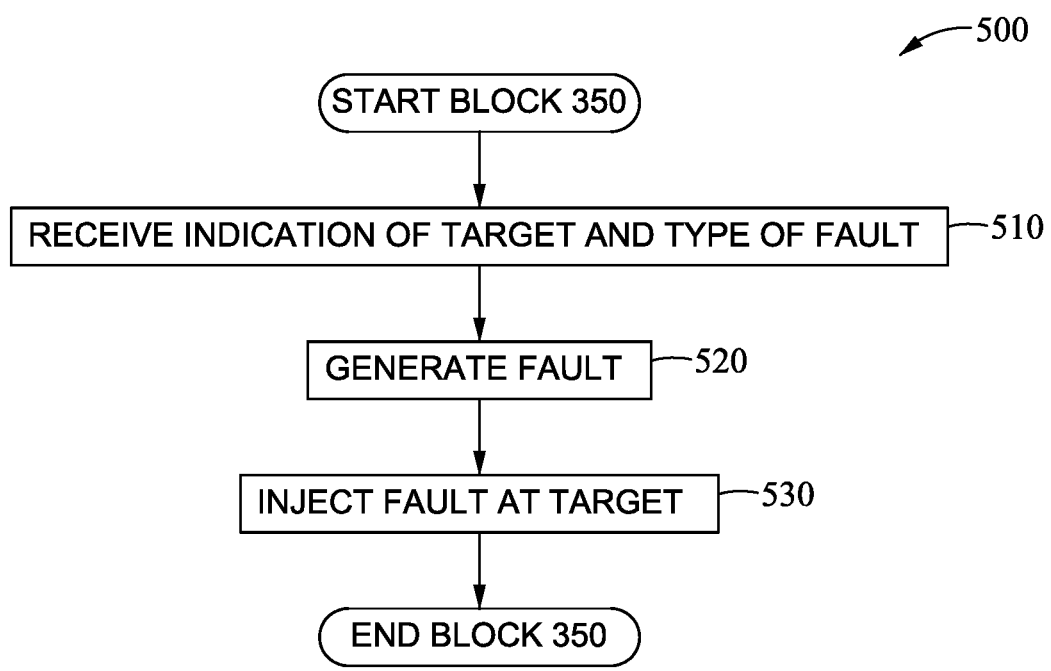
FIG. 5 is a flow chart illustrating a method for inserting a fault into a network, according to one embodiment.

FIG. 5 is a flow chart illustrating a method 500 corresponding to block 350 for inserting a fault into a network, according to one embodiment. As shown, the method 500 begins at block 510, where a network element $101_N$ receives an indication of the target of the fault and the type of the fault. In one embodiment, the network element $101_N$ executing the instance of the fault injection engine 105 is the target, and receives the indications. In other embodiments, the network element $101_N$ is an SDN controller that receives the indications from the fault injection engine 105 executing on a different network element $101_m$. In some embodiments, the network monitor 103, prediction engine 104, and fault injection engine 105 execute on one or more of the computing devices $102_{1-N}$, which then communicate indications of the fault target and/or type from the user of a given computing device $102_N$. At block 520, the fault injection engine 105 generates the fault (e.g., by identifying code configured to implement the fault). At block 530, the fault injection engine 105 injects the fault at the target. For example, the fault injection engine 105 may execute code to disable a network port, generate and transmit garbage data, and the like. Doing so injects the fault at the target.

Figure 6:
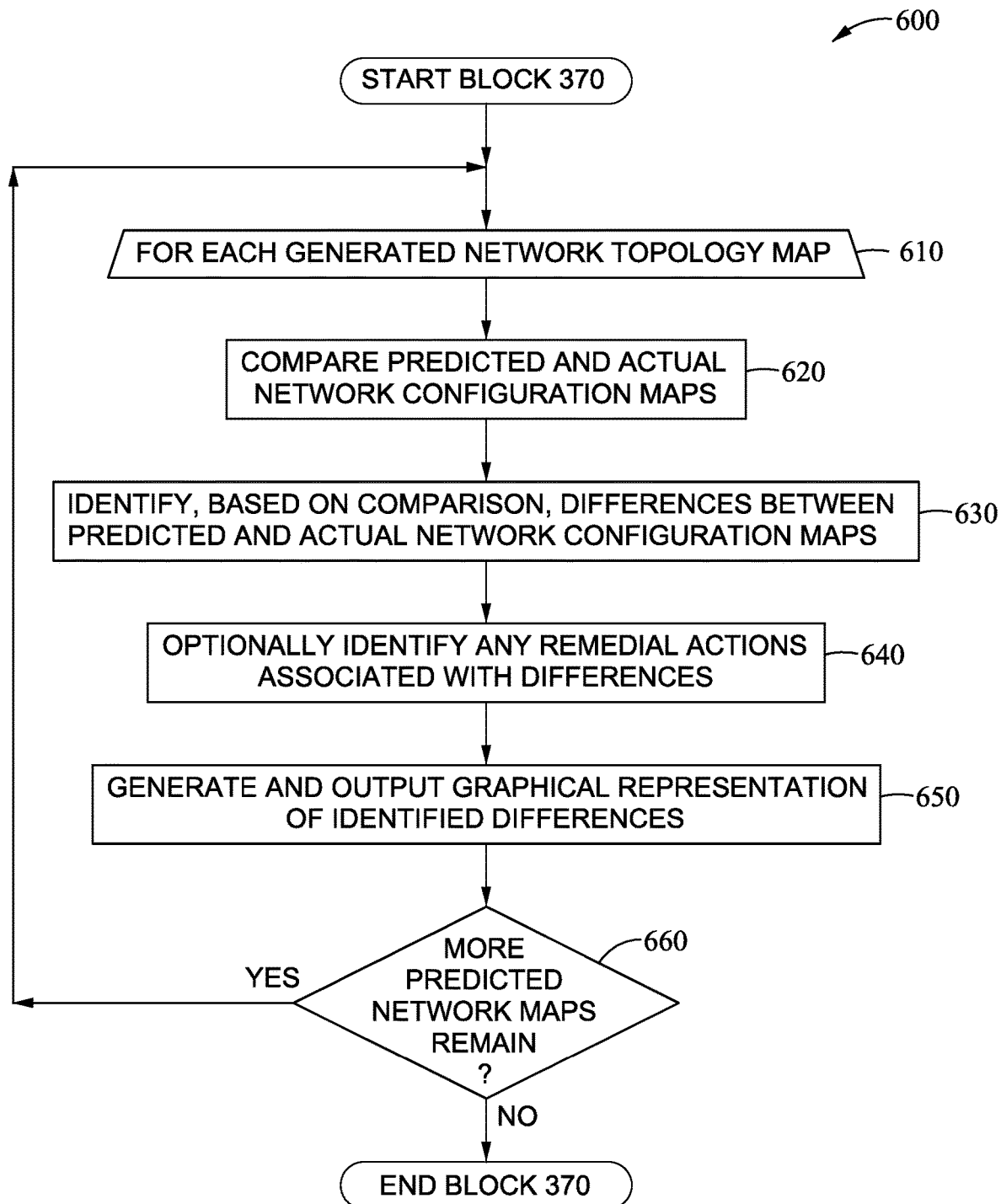
FIG. 6 is a flow chart illustrating a method to compare a resultant network configuration to a predicted network configuration, according to one embodiment.

FIG. 6 is a flow chart illustrating a method 600 corresponding to block 370 to compare a resultant network configuration to a predicted network configuration, according to one embodiment. As shown, the method 600 begins at block 610, where the network monitor 103 executes a loop including blocks 620-650 for each predicted network map 106 generated at block 450. At block 620, the network monitor 103 compares the current predicted network map 106 generated at block 450 to the actual, resultant network map 106 generated at block 360 after the fault is injected. At block 630, the network monitor 103 identifies, based on the comparison, differences between the current predicted network map 106 and the actual network map 106. For example, if the predicted network map 106 specified that a network link would be disabled, but the actual network map 106 reflects that the network link is in operation, the network monitor 103 determines the network link as a difference. Furthermore, the network monitor 103 may optionally store an indication of the identified differences as metadata for the current predicted network map 106.

At block 640, the network monitor 103 optionally identifies any remedial actions associated with the identified differences. For example, if the actual network map 106 does not utilize optimal routing, the network monitor 103 may identify any actions required to reconfigure the network 100 to utilize the optimal routing. At block 650, the network monitor 103 generates and outputs a graphical representation of the differences identified at block 630. The graphical representation may include the current predicted network map 106, the actual network map 106, and may highlight the identified differences. The graphical representation may further include metadata attributes of network entities, optimal routes, and the like. At block 660, the network monitor 103 determines whether more predicted network maps 106 remain. If more predicted network maps remain, the method returns to block 610. Otherwise, the method 600 ends.

Figure 7:
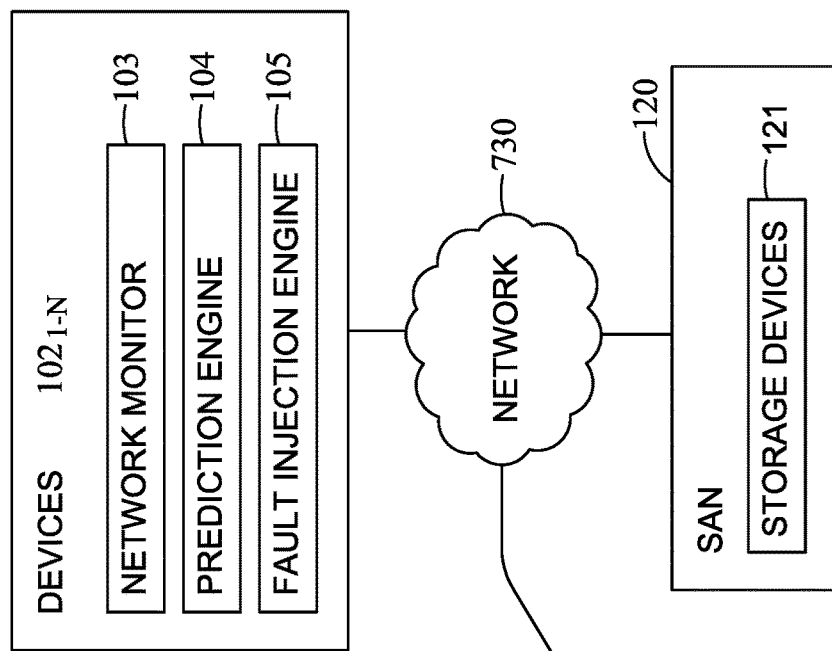
FIG. 7 illustrates an example system which tests and delivers verification of network configurations, according to one embodiment.
Figure 7:
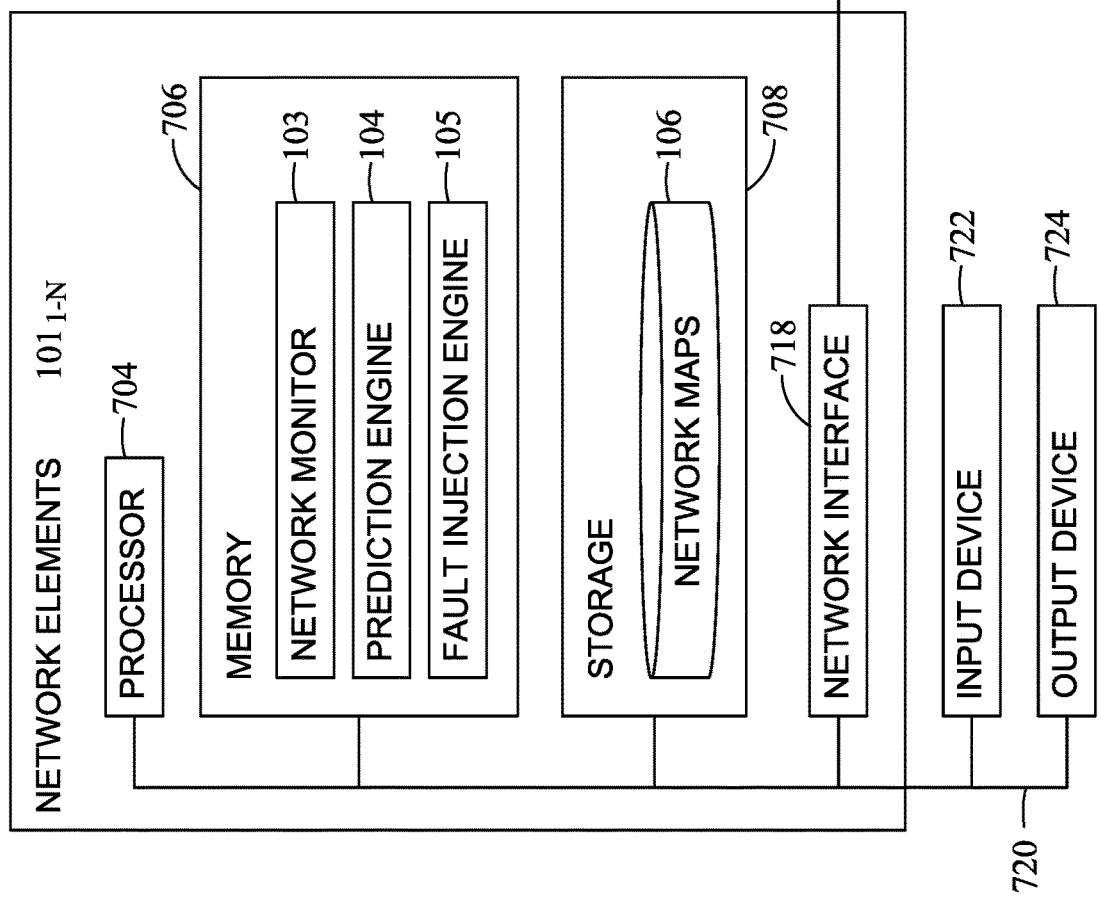

FIG. 7 illustrates an example system 700 which tests and delivers verification of network configurations, according to one embodiment. The networked system 700 includes the network elements $101_{1-N}$. The network elements $101_{1-N}$ may also be connected to other computers (e.g., the devices $102_{1-N}$ and/or the storage devices 121 of the SAN 120) via a network 730. In general, the network 730 may be a telecommunications network and/or a wide area network (WAN). In a particular embodiment, the network 730 is the Internet.

The network elements $101_{1-N}$ generally include a processor 704 which obtains instructions and data via a bus 720 from a memory 706 and/or a storage 708. The network elements $101_{1-N}$ may also include one or more network interface devices 718, input devices 722, and output devices 724 connected to the bus 720. The network elements $101_{1-N}$ are generally under the control of an operating system (not shown). Any operating system supporting the functions disclosed herein may be used. The processor 704 is a programmable logic device that performs instruction, logic, and mathematical processing, and may be representative of one or more CPUs. The network interface device 718 may be any type of network communications device allowing the network elements $101_{1-N}$ to communicate with other computers and network elements via the network 730.

The storage 708 is representative of hard-disk drives, solid state drives, flash memory devices, optical media and the like. Generally, the storage 708 stores application programs and data for use by the computer 702. In addition, the memory 706 and the storage 708 may be considered to include memory physically located elsewhere; for example, on another computer coupled to the network elements $101_{1-N}$ 702 via the bus 720.

The input device 722 may be any device for providing input to the network elements $101_{1-N}$. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the network elements $101_{1-N}$. The output device 724 may include output devices such as monitors, touch screen displays, and so on.

As shown, the memory 706 contains the network monitor 103, the prediction engine 104, and the fault injection engine 105, each described in greater detail above. As shown, the storage 708 contains the network maps 106. The devices $102_{1-N}$ are shown to include instances of the network monitor 103, the prediction engine 104, and the fault injection engine 105. Generally, the system 700 is configured to implement all apparatuses, methods, and functionality described above with reference to FIGS. 1-6.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the prediction engine 104 could execute on a computing system in the cloud and generate a plurality of predicted network maps 106. In such a case, the prediction engine 104 could store the generated network maps 106 at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   receiving an indication of a type and a target of a fault to inject in a network, wherein the network comprises a plurality of devices and a plurality of network elements, and wherein the type of the fault comprises flooding one or more of the plurality of network elements with garbage data by transmitting data that is not properly formatted;
   generating at least a first predicted network map depicting a predicted configuration of the plurality of devices and the plurality of network elements subsequent to injecting the fault in the network;
   injecting the fault at the target in the network, wherein injecting the fault at the target in the network comprises transmitting one or more control signals to the target in the network;
   determining an amount of time that has elapsed since the garbage data was transmitted;
   upon determining that the determined amount of time exceeds a predefined amount of time, generating an actual network map depicting an actual configuration of the plurality of devices and the plurality of network elements;
   identifying, based on a comparison of the first predicted network map and the actual network map, at least one difference in the predicted and actual configurations; and
   outputting for display an indication of the identified at least one difference.

2. The method of claim 1, further comprising:
   prior to receiving the indication:
      determining a current state of the plurality of devices and the plurality of network elements prior to injecting the fault in the network;
      generating a current network map depicting a current configuration of the network, based on the current state of the plurality of devices and the plurality of network elements prior to injecting the fault in the network; and
      outputting the current network map depicting the current configuration of the plurality of devices and network elements prior to injecting the fault in the network.

3. The method of claim 2, the method further comprising:
   generating a plurality of predicted network maps depicting predicted configurations of the plurality of devices and the plurality of network elements subsequent to injecting the fault in the network; and
   for each respective predicted network map of the plurality of predicted network maps:
      identifying, based on a respective comparison of the respective predicted network map and the actual network map, at least one difference; and
      outputting for display a graphical representation of the identified at least one difference, wherein the graphical representation of the at least one difference comprises highlighting the at least one difference on the display.

4. The method of claim 1, wherein the target comprises at least one of: (i) a first device of the plurality of devices, and (ii) a first network element of the plurality of network elements, wherein the type of the fault comprises one or more of: (i) enabling a network port, (ii) disabling a network port.

5. The method of claim 1, wherein the at least one difference comprises a first network route in the actual configuration of the plurality of devices and network elements not matching an optimal network route in the first predicted network map.

6. The method of claim 5, further comprising:
   identifying a set of actions configured to modify the first network route to match the optimal network route; and
   executing each actions in the set of actions to modify the first network route to match the optimal network route.

7. The method of claim 1, wherein the network comprises a software defined network (SDN), wherein an indication of the fault is received via a SDN protocol that supports transmission of the type and the target of the fault, wherein a SDN controller injects the fault at the target in the network.

* * * * *